US006595505B1

(12) United States Patent
Loewert

(10) Patent No.: US 6,595,505 B1
(45) Date of Patent: Jul. 22, 2003

(54) WORK STATION

(75) Inventor: Claude Loewert, Meyenheim (FR)

(73) Assignee: Ergos, S.A., Ensisheim (FR)

(*) Notice: Subject to any disclaimer, the term of this patent is extended or adjusted under 35 U.S.C. 154(b) by 0 days.

(21) Appl. No.: 09/936,409

(22) PCT Filed: Mar. 10, 2000

(86) PCT No.: PCT/FR00/00587

§ 371 (c)(1),
(2), (4) Date: Sep. 12, 2001

(87) PCT Pub. No.: WO00/54940

PCT Pub. Date: Sep. 21, 2000

(30) Foreign Application Priority Data

Mar. 12, 1999 (FR) .......................................... 99 03185

(51) Int. Cl.[7] .................................................. B23Q 3/00
(52) U.S. Cl. ......................................... 269/16; 269/901
(58) Field of Search ................................ 269/900, 901, 269/88, 16

(56) References Cited

U.S. PATENT DOCUMENTS 1,642,771 A 9/1927 Fullarton
3,715,972 A * 2/1973 Kelso et al. ................ 312/239
4,473,935 A * 10/1984 Tatsuura et al. .............. 269/16
4,782,763 A * 11/1988 Salloum ..................... 269/900
5,906,539 A * 5/1999 Tabel ......................... 269/291

FOREIGN PATENT DOCUMENTS

FR 2756506 6/1998

* cited by examiner

*Primary Examiner*—Lee D. Wilson
(74) *Attorney, Agent, or Firm*—Ohlandt, Greeley, Ruggiero & Perle, L.L.P.

(57) ABSTRACT

A work station with modular elements particularly simple to be handled and allowing the station to be transformed in response to the product to be assembled is provided. The work station (1) has a framework (3) consisting of an assembly of plates (5) and multidirectional joining components (6) assembled together to make up compartments (10). Several elements (4) are placed in these compartments, used as a work zone, a storage zone and/or a transfer zone. Elements (4) are held on framework (3) by removable pins (13) or screws permitting rapid mounting and removal. Elements (4) are an interchangeable and can be set up as modules as according to the components handled, the apparatuses and accessories used, the product to be manufactured and the operator's morphology.

16 Claims, 9 Drawing Sheets

6/9

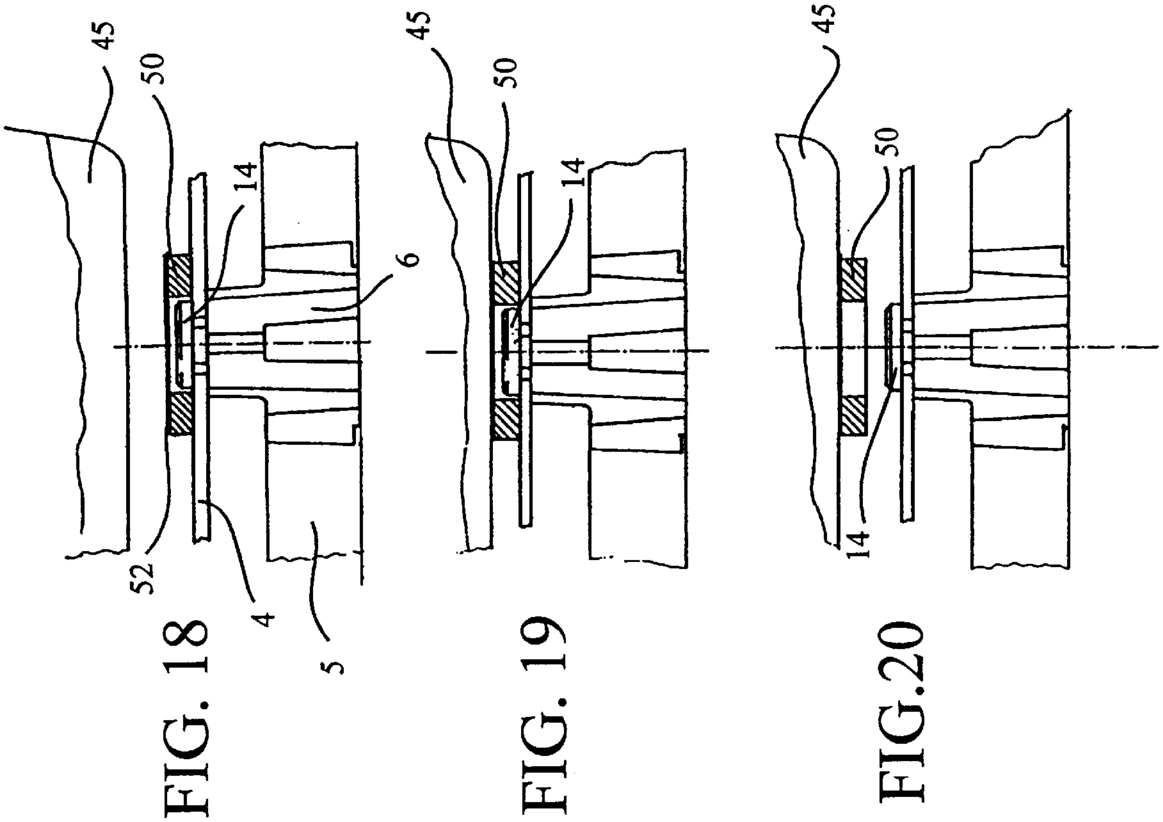
FIG. 18
FIG. 19
FIG.20
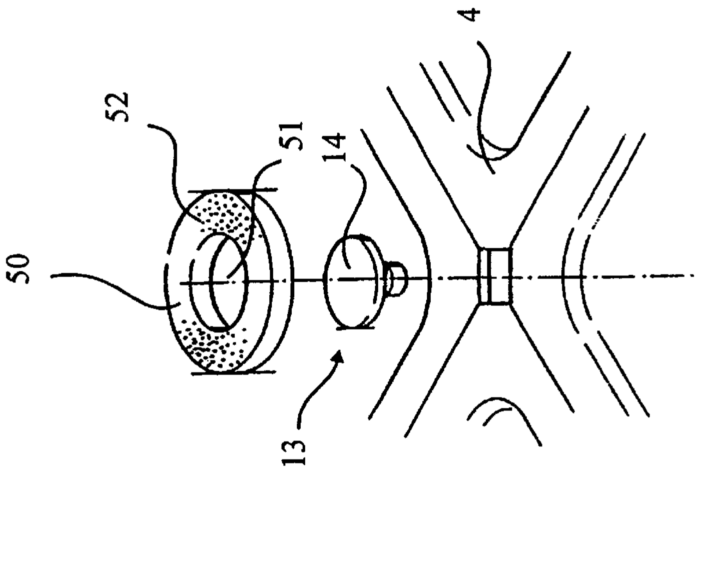
FIG.17

WORK STATION

CROSS REFERENCE TO RELATED APPLICATIONS

The present application is claiming priority of French Patent Application No. 99/03185 filed on Mar. 12, 1999 and PCT Patent Application No. PCT/FR00/03185 filed on Mar. 10, 2000.

BACKGROUND OF THE INVENTION

1. Field of the Invention

The present invention concerns a work station used to carry out one or more repetitive tasks determined by an operator during the manufacture of a product manufactured from several components, such as assembly, machining, inspection or the like, comprising a support table and several elements juxtaposed on the support table, said elements comprising at least one storage zone and/or one support zone and/or one transfer zone and/or one work zone.

2. Description of the Prior Art

Such stations exist on the market but the elements that compose them are in general already integrated in the support table. These stations can thus only be used for a single type of product to be assembled. This means that it is necessary to have almost as many work stations as types of products to be assembled, which involves a very large investment. This type of station is notably described in publication FR-A-2,756,506 which defines a support table in the form of a three-dimensional one-piece shell integrating compartments directly making up said zones or compartments arranged to receive the elements comprising these zones.

There are other stations in which the elements are simply positioned on the support table. The elements can then be removed at will to modify the structure of the work station. Nevertheless, the elements have different shapes and when they are switched around, empty spaces are created into which components may fall. The elements may also become displaced with regard to one another due to the effect of vibrations created, for example, by the machines arranged under the support table. In this case as well, gaps may be formed in which dust and components accumulate.

There are still other stations in which the elements are removable and housed in a fixed support. For example, publication U.S. Pat. No. 1,642,771 describes an assembly carousel formed of identical removable triangular compartments placed side by side in the order of assembly of the parts. In addition, publication U.S. Pat. No. 3,715,972 describes a cleaning station provided with several removable vats placed side by side within a framework and interchangeable as needed. Nevertheless, the design of these work stations does not permit offering a large choice of combinations, nor creating three-dimensional stations. Consequently, their applications are relatively limited.

The present invention seeks to alleviate these disadvantages by proposing a work station according to elements that can be set up as modules, which permit setting up the station with the product to be assembled, which are easy to implement, which permit obtaining a station of great tidiness, and which allow a broad range of combinations and geometries both in two and three dimensions.

With this object, the invention concerns a work station of the type indicated in the preamble, characterized in that it comprises a framework made up of at least two subunits having complementary shapes so as to be assembled together in order to be interchangeable and set up as modules, each subunit being solidly mounted on the support table and arranged to define compartments, each compartment having a shape designed to receive an element and in that said elements are held in the framework subunits by removable assembly means so that these elements can be set up as modules as a function of the components handled, the apparatuses and accessories used, the product to be manufactured and the morphology of the operator.

According to a first form of embodiment, the subunits of the framework are made up of an assembly of plates and multidirectional joining pieces, said plates having ends with shapes complementary to said joining pieces so as to be assembled with one another to make up said compartments. These plates can have at least one through-hole designed to receive an attachment screw for attaching said plate to the support table.

According to a second form of embodiment, the subunits of the framework are made up of an assembly of prefabricated frame pieces in shapes designed to receive an element, said frame pieces having assembly means of complementary shape in order to be fastened to one another. These assembly means can be made up of at least one vertical guide groove provided on each side of the frame pieces, the guide groove of one side being offset with regard to that provided on the opposite side of the frame piece.

According to a third form of embodiment, the subunits of the framework are made up of an assembly of profiles having complementary vertical slots so that the profiles can be inserted in one another to form said compartment.

The station according to the invention may include a finishing cover piece to receive the periphery of the framework. Said cover can have on its inner surface at least one rib engaged in a corresponding recess provided on the joining piece.

In an advantageous manner, the elements have an edge roughly at a right angle and of a sufficient width to rest, according to the variants, on the upper end of a joining piece or on the upper edge of their compartment, when the elements are placed in their compartment. In a particularly advantageous manner, the corners of the edge of the elements are chamfered and said removable assembly means are made up of pins or screws having a head with a diameter greater than the empty space defined by the chamfer and at least one shaft provided to be pushed into or screwed into at least one opening provided in the upper end of the joining piece.

Preferably, the elements have shapes suitable for their functions. Some, for example, may have at least one raised edge to facilitate gripping of components. Some can also comprise grooves on their bottom to facilitate the gripping of the components.

The station may also be equipped with elements of upright form arranged on the elements already placed on the framework. So as to immobilize said upright elements, gripping pieces are provided between the elements and the pins. These gripping pieces can have an opening of dimensions designed to closely fit with the head of a pin. They can be attached by gluing, screwing or riveting.

The present invention also concerns the arranged elements in order to be used in the work station defined above.

DESCRIPTION OF THE FIGURES

The present invention and its advantages will appear more clearly in the following description of different forms of embodiment, in reference to the attached drawings, in which:

FIG. 17 shows the mounting of one gripping element according to the invention, and FIGS. 18 to 20 show the three steps for use of a gripping element according to the invention.

DETAILED DESCRIPTION OF THE INVENTION

With reference to FIGS. 1 to 9, work station 1 according to the invention comprises a support table 2 on which is solidly mounted a framework 3. Elements 4 are placed on this framework 3, these elements 4 comprising a work zone or a storage zone for components to be assembled, or accessory support zones, for example, or zones for transfer of said components. The assembly of these elements makes up a work station for conducting the repetitive tasks deemed necessary when a product is assembled from different components contained in different elements.

Figure 1:
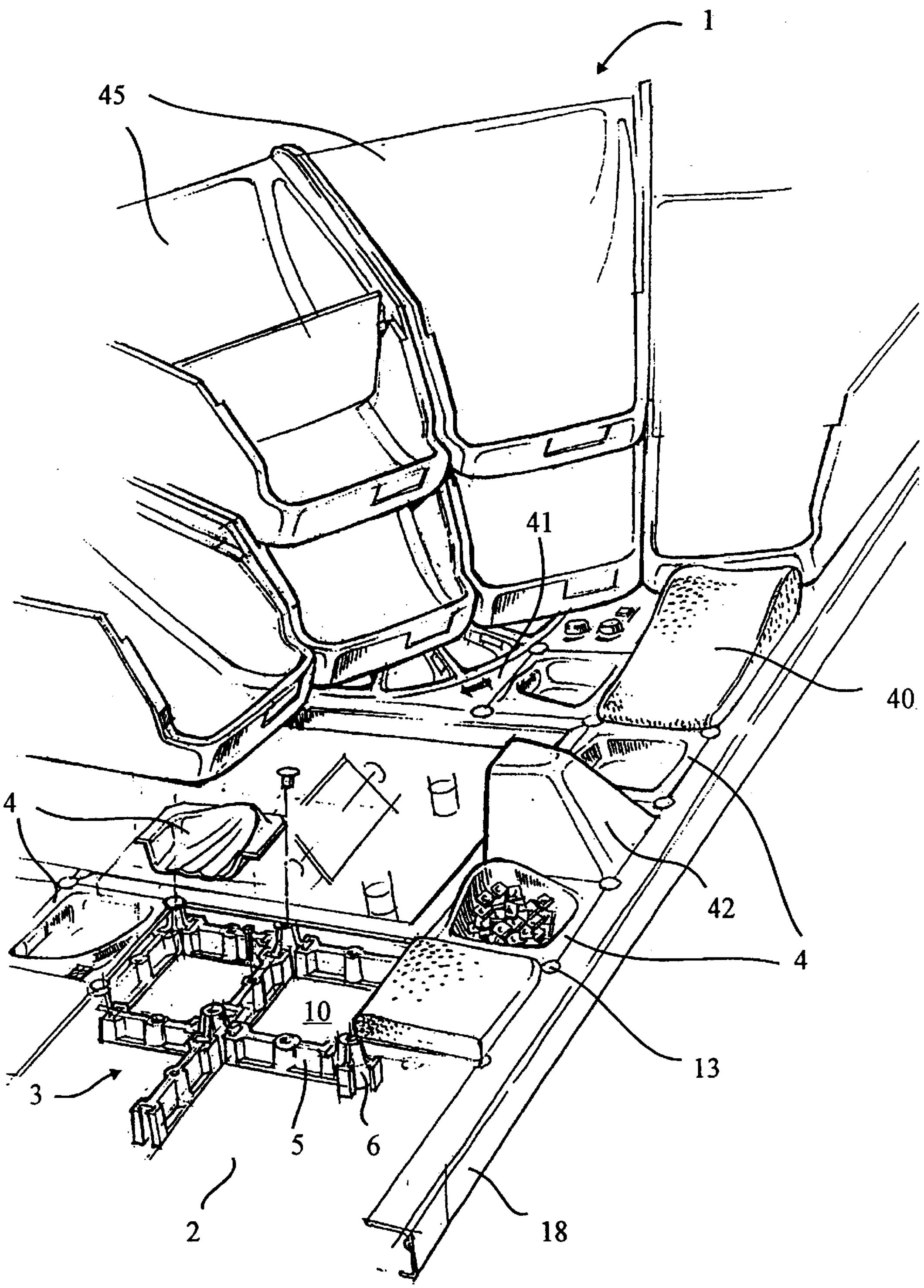
FIG. 1 shows a partially exploded general view of a first form of embodiment of the station according to the invention.
Figure 2:
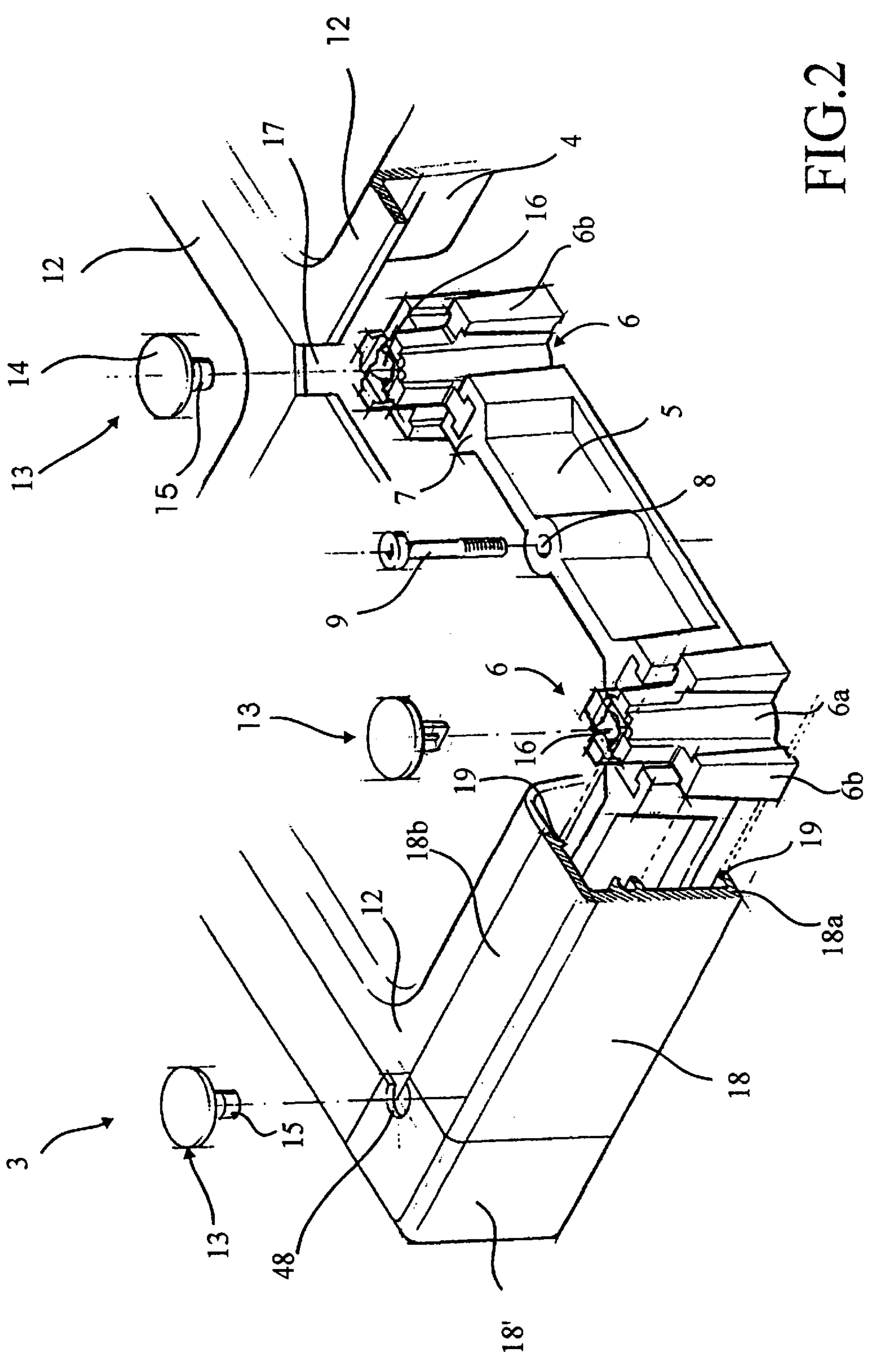
FIG. 2 is a partial perspective view of a first form of embodiment of the framework of the station according to the invention.
Figure 3:
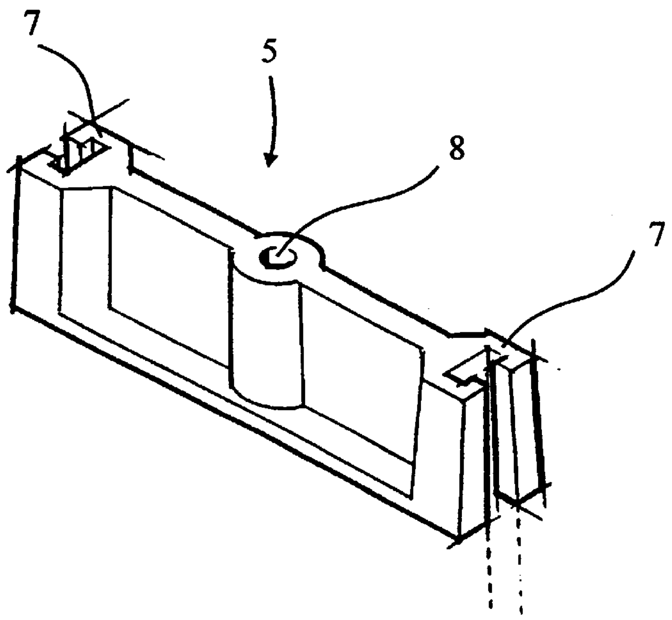
FIG. 3 is a perspective view of a plate used according to this first form of embodiment.
Figure 4:
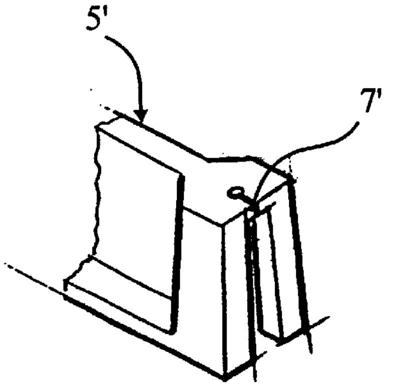
FIG. 4 is a partial perspective view of another form of the plate used according to this first form of embodiment.
Figure 5:
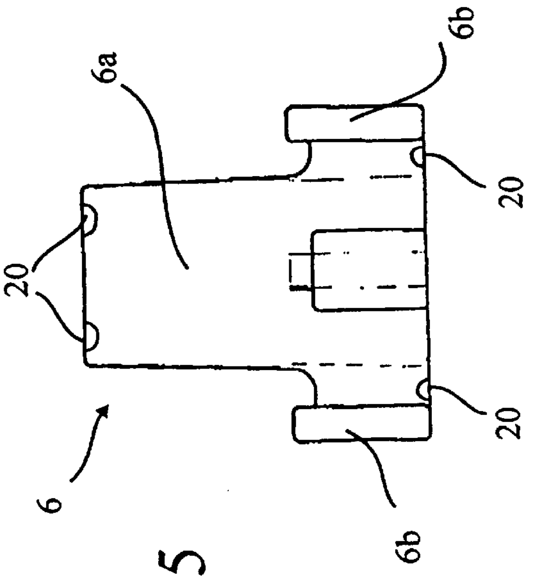
FIG. 5 is a front view of a joining piece according to the invention.
Figure 6:
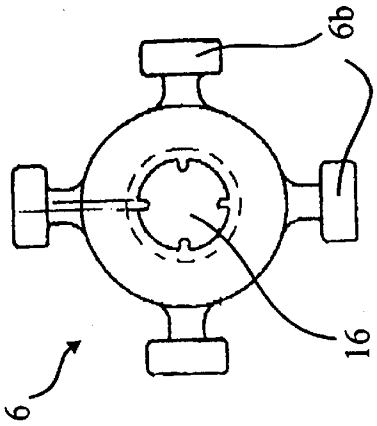
FIG. 6 is a top view of the joining piece of FIG. 5.

As is shown more precisely in FIG. 2, framework 3 is made up of an assembly of plates 5 and multidirectional joining pieces 6. As FIG. 3 shows, a plate 5 has ends 7 in the form of hooks and a through-hole 8 at its center designed to receive a screw 9 to attach plate 5 onto support table 2. FIG. 4 shows another form of plate 5' for which ends 7' are made up of a split flange. With reference more particularly to FIGS. 5 and 6, joining piece 6 has a slightly conical central form **6*a* provided at its upper end with an opening 16 whose role will be described later. Joining piece 6 has four tabs 6*b* at its periphery arranged at roughly 90° and having a T-section complementary to ends 7 in the form of hooks of plate 5. Thus, two to four plates 5 can be assembled together by inserting tabs 6*b* in ends 7 in the form of hooks, tabs 6*b* being chosen as a function of the desired directions, so as to form square or rectangular compartments 10 (see FIG. 1) in which elements 4** are arranged.

Figure 7:
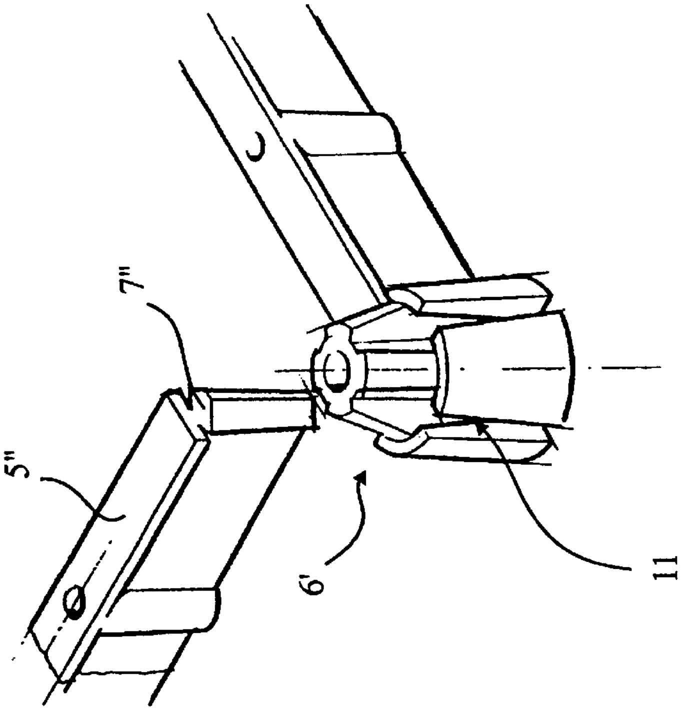
FIG. 7 shows partially one variant of embodiment of the plates and joining pieces according to the invention.

It is very clear that the ends of the plates and the joining pieces can have other complementary forms. One possible example of embodiment is shown in FIG. 7. In this variant of embodiment, plate 5" has a protuberant end 7" complementary to grooves 11 provided on joining piece 6' so that end 7" of plate 5" is encased in groove 11 to form compartments 10.

Elements 4 which are arranged on framework 3 comprise an edge 12 roughly at a right angle and sufficiently wide to be able to rest on a part of the upper end of joining pieces 6 when elements 4 are placed in their compartment 10 to make up work station 1.

Figure 12:
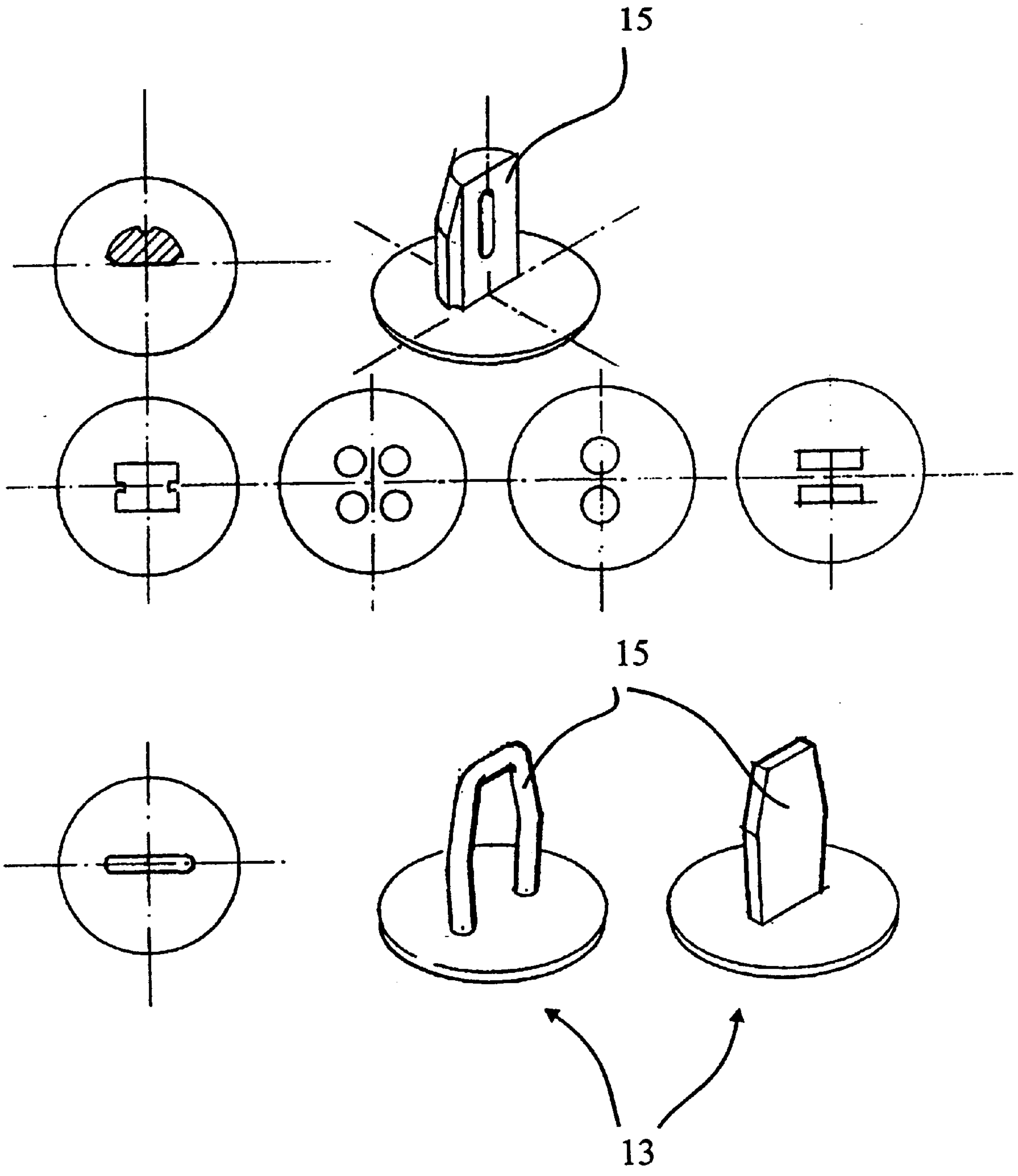
FIG. 12 shows different forms of embodiment of the pins according to the present invention.
Figure 13:
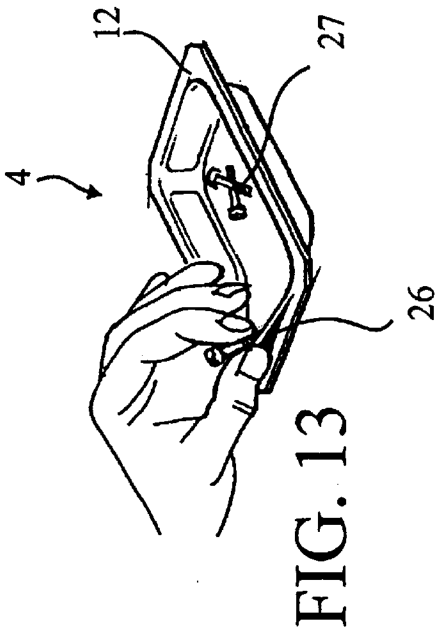
FIGS. 13 to 16 show different forms of the elements according to the present invention.
Figure 14:
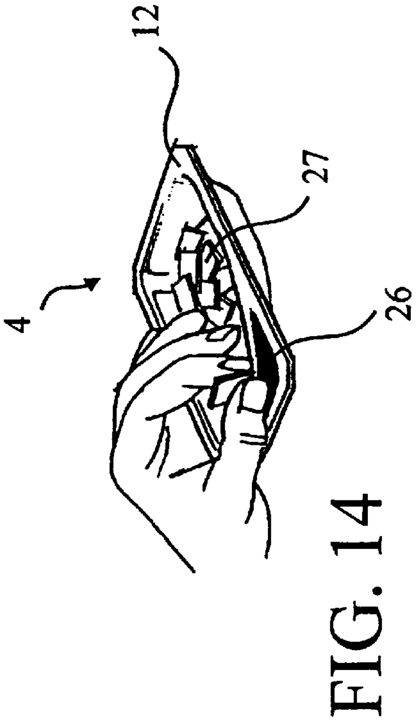
Figure 15:
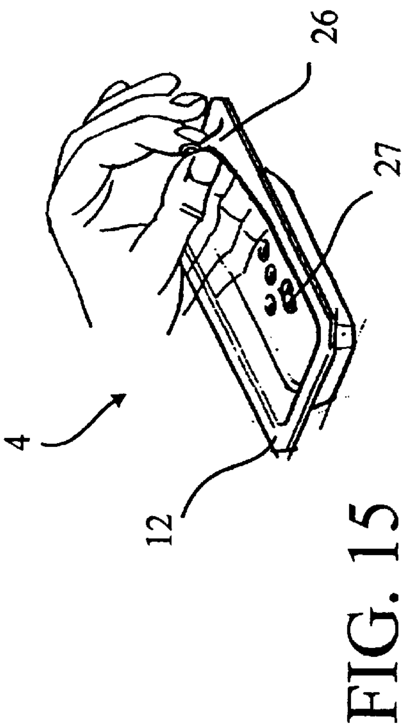
Figure 16:
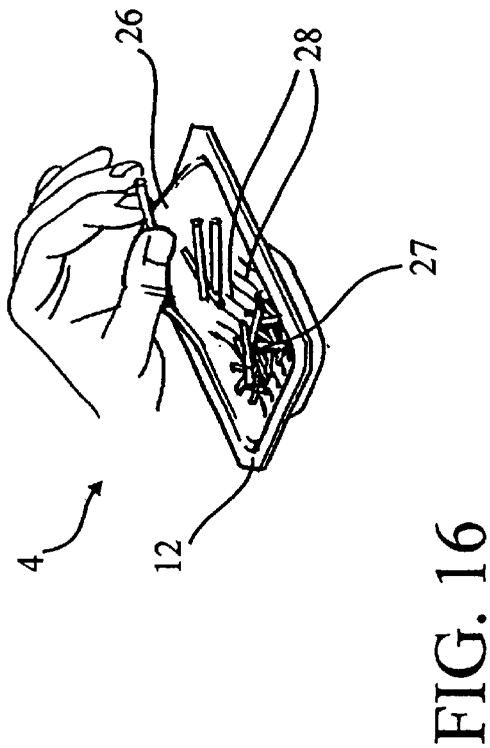

The four corners of edge 12 of elements 4 are chamfered, for example, by 45°, as is shown particularly in FIGS. 2 and 13 to 16. Elements 4 are held in compartment 10 by means of pins 13 or screws, which are made up of a head 14 and a shaft 15 threaded or unthreaded, said shaft 15 being designed to be gently pushed into or screwed into opening 16 provided at the upper end of joining piece 6. Head 14 has a diameter greater than the empty space defined by the chamfer. With reference to FIG. 2, when three elements 4 are arranged in their compartment 10, the chamfers of edges 12 define an empty space 17 in the shape of a square. The diameter of head 14 must therefore be greater than the diagonal of this square 17 so as to be able to grip edge 12 of elements 4 between pin 13 and joining piece 6. In this case, the shaft has a circular shape. FIG. 12 shows different shapes of shaft 15 of pin 13; either semi-circular, flat or with several nipples. Pin 13 may be replaced of course by any other equivalent means, such as, for example, a screw, and in this case, shaft 15 is threaded.

In order to improve the esthetic appearance of work station 1, the periphery of framework 3 is provided with an finishing cover 18 which comes to be level with elements 4 placed at the periphery of station 1. Angular cover pieces 18' are arranged at the angles, which [pieces] have a roughly circular cutout 48 on their upper surface to receive shaft 15 of a pin 13.

Finishing cover 18 has three walls roughly in the shape of a U, one of the arms of the U being smaller than the other, however, since this arm **18*a* is designed to be clipped under joining piece 6. The other arm 16*b* is clipped onto the upper end of joining piece 6. For this purpose, arms 18*a* and 18*b* of the U have grooves 19 which engage in corresponding recesses 20 provided respectively at the upper end and below joining piece 6**.

Figure 9:
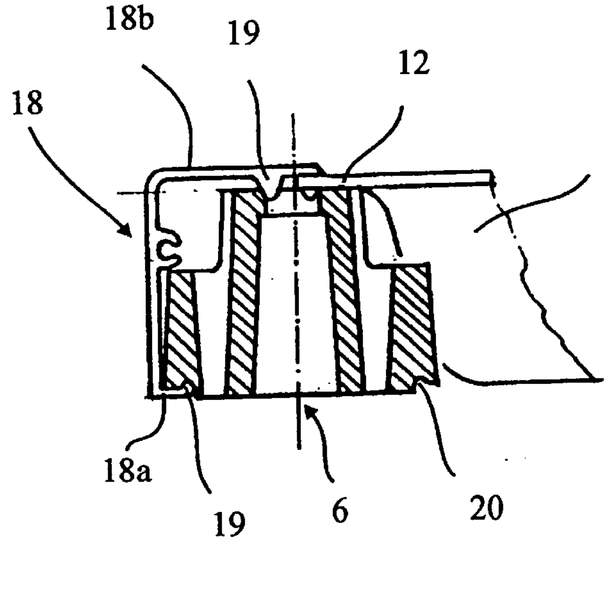
FIG. 9 is a longitudinal sectional view of FIG. 8.
Figure 8:
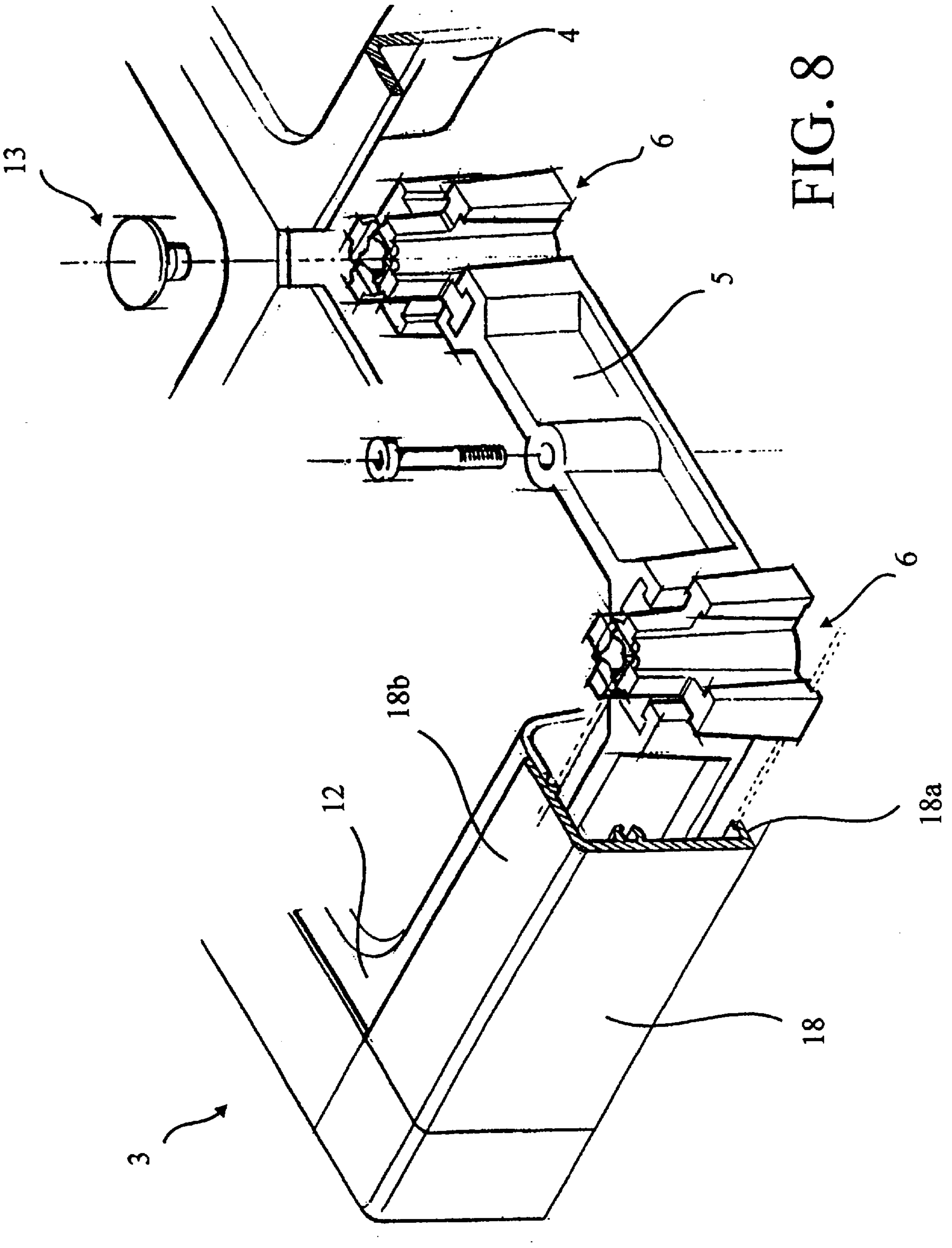
FIG. 8 is a view similar to FIG. 2 showing another form of the finishing cover.

In another variant shown in FIGS. 8 and 9, finishing cover 18 partially covers edge 12 of elements 4 placed at the periphery of station 1. FIG. 9 more particularly shows arms **18*a* and 18*b* of the U with ribs 19 which engage in corresponding recesses 20 of joining piece 6**.

Figure 10:
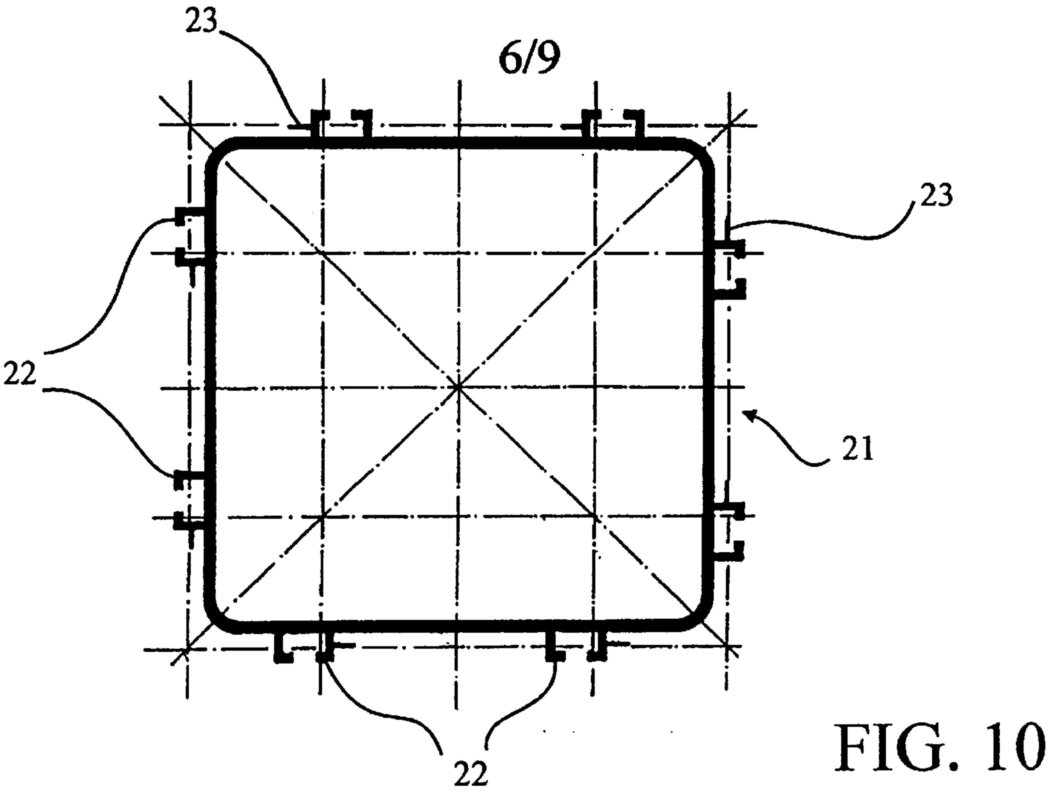
FIG. 10 is a top view of a compartment according to a second form of embodiment of the framework according to the invention.

With reference to FIG. 10, another form of embodiment of framework 3 according to the invention consists of assembling prefabricated frame pieces 21 of a square or other shape, designed to receive elements 4. These frame pieces 21 can be used whole or in sectioned parts according to need. Frame pieces 21 have vertical guide grooves 22 on their periphery, the guide grooves on one side being offset with regard to the guide grooves of the opposite side. One guide groove has a wing 23 constituting a stop on one of its sides. Thus frame pieces 21 are assembled by sliding the guide groove of one frame piece 21 into the guide groove of another frame piece 21 to form framework 3, wing 23 of one guide groove 22 abutting against guide groove 22 of the adjacent frame piece to reinforce the assembly. Then, elements 4 are placed in frame pieces 21, their edge 12 being of a sufficient width to rest on the upper edge of their frame piece 21.

Figure 11:
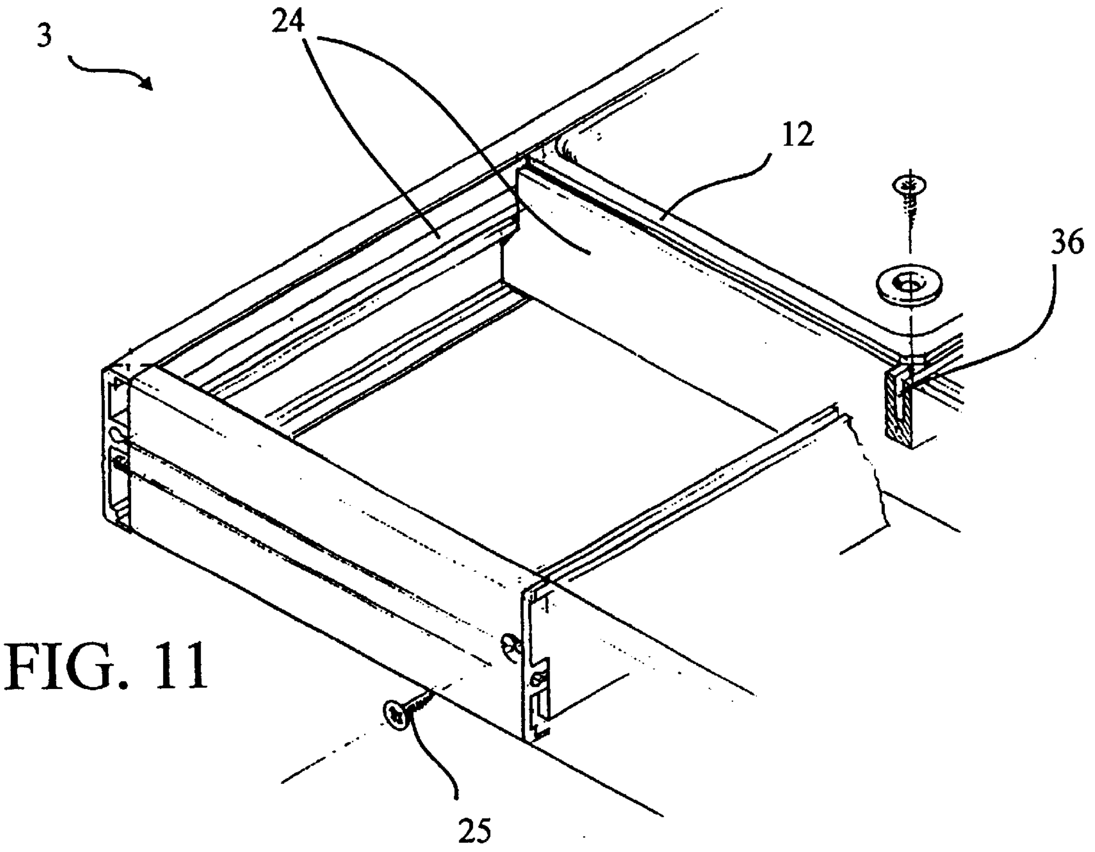
FIG. 11 is a partial perspective view of a third form of embodiment of the framework according to the invention.

A third form of embodiment of framework 3 is shown in FIG. 11. In this variant, framework 3 is made up of an assembly of profiles 24 having vertical complementary slots 36 so as to be encased in one another to form different compartments in which elements 4 are placed. Elements 4 also have an edge 12 sufficiently wide so that it rests on the upper edge of the compartments thus formed. The different profiles can be attached by means of screws 25.

With reference now to FIGS. 13 to 16, elements 4 placed in framework 3 have roughly the form of rectangular vats with an edge 12 whose corners are chamfered for the reasons disclosed above. Elements 4 of course, must be of dimensions proportional to those of plates 5 or profiles 24. In the second variant, each frame piece 21 must be adapted to the dimensions of each element 4.

Inside the rectangular vats, elements 4 have shapes specific for carrying out different functions. It has already been seen that some elements 4 serve for storage zones for components 27. In this case, elements 4 can have raised edges 26 permitting facilitating the gripping of components 27. Elements 4 may also have grooves 28 on their bottom, which improve the guidance and gripping of components 28.

With reference to FIG. 1, elements 40 have the form of elbowboards. Another element 41 has the shape of a rotating plate. The elements also comprise support zones, such as element 42 used to support a light source as well as for aspiration of fumes in the case of a station comprising a welding operation.

Elements 4 can also comprise transfer zones. For example, an element can be provided with a pierced bottom serving for a drainage channel.

Elements 4 can be made by heat-molding. Some elements 4 can be made of a machinable material so that the inside can be machined and adapted in position to the product to be manufactured or to the component contained.

In order to provide volume to work station 1 and to optimize its arrangement, upright elements 45 are provided, and these are arranged on elements 4 already in place on framework 3. These upright elements 45 may be, for example, positioned above the element in the shape of a rotating plate 41, this plate comprising several compartments. Thus, this arrangement permits not wasting space since it is sufficient to allow access to a few compartments, the others being accessible by rotating the plate. Since upright elements 45 are eccentric with regard to the center of the work station, they can be filled with components outside the work zone.

In the first variant of the work station described, the upright elements rest on pins 13. With reference to FIGS. 17 to 20, gripping pieces 50 are provided between pins 13 and the lower surface of upright elements 45, in order to immobilize upright elements 45 on elements 4 already in place. These gripping pieces 50 have the form of a thin washer and have an opening 51 at their center of dimensions designed to fit with the shape of head 14 of pin 13. It is clear that gripping pieces 50 can also be square, rectangular or polygonal.

Gripping pieces 50 have an adhesive layer 52 on their upper surface covered in a known manner with a protective film. Thus, during the creation of station 1, gripping pieces 50 are arranged on pins 13 (FIG. 18) and then upright elements 45 are positioned. Once upright elements 45 are optimally positioned, the protective film is removed in order to grip upright elements 45 in their definitive position (FIG. 19). In the case where an upright element 45 is removed, holding piece 50 remains joined to the latter (FIG. 20). This upright element 45 can then be easily and precisely repositioned.

Gripping pieces 50 can be attached by any known assembly means such as screwing or riveting.

The work station according to the invention is particularly simple to position. It is sufficient in fact to assemble the different pieces of framework 3 to make up compartments 10 and place elements 4 therein. Elements 4 are then held with pins 13 or screws. Elements 4 are then easily removable. Thus, one or more elements 4 can be easily removed and replaced by one or more other elements of equivalent dimensions. The station according to the invention is therefore extremely modular and flexible since the elements can be set up as modules as a function of the components handled, the apparatuses and accessories used, the product to be manufactured and the morphology of the operator. The geometry of the work station can also be set up as modules both in two and three dimensions. Each element of the same station can also be made of a material specific to its function. Thus an antistatic material can be provided, or a flexible material to resist abrasion.

The variant shown in FIG. 3 which uses ends in the form of hooks has the advantage of permitting a tight adjustment between joining pieces 6 and plates 5. Thus, it is possible to assemble and separately manipulate the removable assemblies or subunits composed of several compartments and elements 4.

A single framework can be used to create different styles of work stations, the station being able to evolve with the product to be manufactured. It is thus possible to provide elements as a function of the series to be manufactured and to mount the elements corresponding to a series in progress.

On the one hand, the elements are assembled in a homogeneous manner, without empty space. The work station is therefore esthetic and remains clean. The different elements can be easily removed to be cleaned at will. When an element is removed to be cleaned, it can be replaced by an identical replacement element so that the work can continue.

The present invention is not limited to the examples of embodiment described but extends to any modification and variant that is obvious to a person skilled in the art. Notably, the elements and framework may have shapes other than rectangular, such as hexagons or triangles, the shapes of the compartments remaining complementary to those of the elements so as to receive them. Joining pieces can also be provided, which permit orienting the plates according to angles different from 90°, the elements having suitable shapes.

What is claimed is:

1. A work station for carrying out one or more determined repetitive tasks by an operator during manufacture of a product manufactured from several components for assembly, machining, and inspection, comprising:

a framework having at least two subunits with complementary shapes so that said at least two subunits are assembled with one another and interchangeable with one another defining a plurality of modules, each of said at least two subunits of said framework being mounted on a support table and arranged to define a plurality of compartments, said at least two subunits having an assembly of plates and multidirectional joining pieces, said plates having ends with shapes complementary to said joining pieces, wherein said plates are assembled with one another to form said plurality of compartments;

a plurality of elements connected to said support table, said plurality of elements being selected from the group consisting of a storage zone, a support zone, a transfer zone and any combinations thereof; and each of said compartments having a form adapted to receive said plurality of elements, said plurality of elements being selectively held on said at least two subunits by removable assembly means, wherein said plurality of elements can be assembled depending on the components handled, apparatuses, machines and accessories used, wherein the work station is manufactured according to a pre-selected specification of the operator to interact with the work station in a healthy, comfortable, and efficient manner.

2. The work station of claim 1, wherein said plates have at least one through-hole, said hole being adapted to receive an attachment screw, said screw attaching said plate to said support table.

3. The work station according to claim 1, further comprising a finishing cover having an inner surface, said inner surface having at least one rib engaged in a corresponding groove, said corresponding groove being on a joining piece.

4. The work station according to claim 1, wherein said plurality of elements have an edge, said edge being disposed at about a right angle, said edge having a width sufficient for resting on an upper end of said joining piece when said plurality of elements are placed in said compartments.

5. The work station of claim 4, wherein said edge has a corner, said corner having a chamfer, and wherein said removable assembly means has a connector having a head, said head having a diameter greater than an empty space defined by the chamfer; and at least one shaft adapted to be secured to at least one opening, said opening provided at said upper end of joining piece.

6. The work station according to claim 5, wherein said connector is connected to a plurality of upright element positioning pieces, said plurality of positioning pieces and said connector being fastened on said framework to immobilize said plurality of upright element positioning pieces.

7. The work station according to claim 6, wherein said plurality of upright element positioning pieces have at least one opening, said opening fitting with said head.

8. The work station of claim 5, wherein said connector is selected from the group consisting of a plurality of pins, a plurality of nails, a plurality of fasteners and a plurality of screws.

9. A work station for carrying out one or more determined repetitive tasks by an operator during manufacture of a product manufactured from several components for assembly, machining, and inspection; comprising:

a framework having at least two subunits with complementary shapes so that said at least two subunits are assembled with one another and interchangeable with one another defining a plurality of modules, each of said at least two subunits of said framework being mounted on a support table and arranged to define a compartment;

a plurality of elements connected to said support table, said plurality of elements being selected from the group consisting of a storage zone, a support zone, a transfer zone and any combinations thereof;

a plurality of upright elements, said plurality of upright elements positioned on said plurality of elements on said framework; and each of said compartments having a form adapted to receive said plurality of elements, said plurality of elements being selectively held on said at least two subunits of said frame by removable assembly means, wherein said plurality of elements can be assembled depending on the components handled, the apparatuses, machines and/or accessories used, wherein the work station is manufactured according to a pre-selected specification of the operator to interact with the work station in a healthy, comfortable, and efficient manner.

10. The work station of claim 9, wherein said at least two subunits each are an assembly of at least two prefabricated frame pieces having a shape adapted to receive said plurality of elements, said at least two frame pieces having a complementary shape with respect to one another and being adapted to hook onto one another.

11. The work station according to claim 10, wherein each of said at least two prefabricated frame pieces has a plurality of vertical guide grooves, each of said plurality of vertical guide grooves being disposed such that said at least two prefabricated frame pieces can be connected together.

12. The work station according to claim 10, wherein said plurality of elements have an edge, said edge being disposed substantially at about a right angle, said edge having a sufficient width to rest on said upper edge of said compartments.

13. The work station of claim 9, wherein each of said at least two subunits has an assembly of profiles, said profiles having a plurality of complementary vertical slots inserted in one another forming said compartment.

14. The work station according to claim 9, further comprising a finishing cover adapted to receive a periphery of said framework.

15. The work station according to claim 9, wherein at least one of said plurality of elements has at least one raised edge, said edge facilitating the gripping of components.

16. The work station according to claim 9, wherein at least one of said plurality of elements has a groove disposed on a bottom of said at least one of said plurality of elements, said groove for facilitating gripping of said components.

* * * * *